(12) United States Patent
Harinen

(10) Patent No.: US 12,023,825 B2
(45) Date of Patent: Jul. 2, 2024

(54) DEVICE AND METHOD OF PROCESSING LOGS USING A THERMAL CAMERA

(71) Applicant: Stora Enso OYJ, Helsinki (FI)

(72) Inventor: Marko Harinen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 408 days.

(21) Appl. No.: 17/436,811

(22) PCT Filed: Mar. 6, 2020

(86) PCT No.: PCT/IB2020/051938
§ 371 (c)(1),
(2) Date: Sep. 7, 2021

(87) PCT Pub. No.: WO2020/178787
PCT Pub. Date: Sep. 10, 2020

(65) Prior Publication Data
US 2022/0168920 A1    Jun. 2, 2022

(30) Foreign Application Priority Data

Mar. 7, 2019 (SE) .................................. 1950291-3

(51) Int. Cl.
*B27L 1/05* (2006.01)
*B08B 3/02* (2006.01)
(Continued)

(52) U.S. Cl.
CPC ............... *B27L 1/05* (2013.01); *B08B 3/022* (2013.01); *B08B 5/023* (2013.01); *B08B 13/00* (2013.01);
(Continued)

(58) Field of Classification Search
CPC .... B27L 1/00; B27L 1/14; B27K 5/00; B27K 5/001
See application file for complete search history.

(56) References Cited

U.S. PATENT DOCUMENTS

| | | | |
|---|---|---|---|
| 5,103,883 A | | 4/1992 | Viikari et al. |
| 5,247,978 A | * | 9/1993 | Silenius ................ B27L 1/025 144/208.9 |

(Continued)

FOREIGN PATENT DOCUMENTS

| | | |
|---|---|---|
| EP | 1273404 A1 | 1/2003 |
| WO | 2005032779 A2 | 4/2005 |
| WO | 2007078514 A2 | 7/2007 |
| WO | 2007078524 A2 | 7/2007 |
| WO | 2016070208 A1 | 5/2016 |

OTHER PUBLICATIONS

International search report from corresponding PCT application No. PCT/IB2020/015938, dated May 4, 2020.
Extended European Search Report from corresponding EP application No. 20765785.9, dated Oct. 26, 2022.

*Primary Examiner* — Matthew Katcoff
(74) *Attorney, Agent, or Firm* — Greer, Burns & Crain, Ltd.

(57) ABSTRACT

A device for processing logs, comprises a deicing apparatus (11), a debarking apparatus (22), arranged downstream of the deicing apparatus, a thermal camera (30), arranged to acquire a thermal image of at least one log downstream of the debarking apparatus, and a processing device (40). The processing device (40) is configured to receive the thermal image from the thermal camera, to process the thermal image to determine a log surface temperature, and to provide a deicing control signal to the deicing apparatus (11) based on the log surface temperature. A method of processing logs is also disclosed.

26 Claims, 1 Drawing Sheet

(51) Int. Cl.
   *B08B 5/02*    (2006.01)
   *B08B 13/00*   (2006.01)
   *G01J 5/08*    (2022.01)
   *G01K 13/00*   (2021.01)
   *H04N 23/11*   (2023.01)
   *B27L 11/00*   (2006.01)
   *G01B 11/24*   (2006.01)
   *G01J 5/00*    (2022.01)

(52) U.S. Cl.
   CPC ............ *G01J 5/0859* (2013.01); *G01K 13/00* (2013.01); *H04N 23/11* (2023.01); *B27L 11/00* (2013.01); *G01B 11/24* (2013.01); *G01J 2005/0077* (2013.01)

(56) References Cited

U.S. PATENT DOCUMENTS

| | | | |
|---|---|---|---|
| 6,516,843 B2 | 2/2003 | Jonkka | |
| 6,526,154 B1* | 2/2003 | Taipale | G01N 21/8986 382/108 |
| 8,215,347 B2* | 7/2012 | Brdicko | G01N 21/8986 144/394 |
| 11,007,668 B2* | 5/2021 | Kalwa | B27K 5/007 |
| 2004/0256296 A1* | 12/2004 | Tohkala | B27L 1/045 209/517 |
| 2013/0333805 A1 | 12/2013 | Gagnon et al. | |
| 2017/0341262 A1* | 11/2017 | Fenkart | B05B 14/00 |

\* cited by examiner

DEVICE AND METHOD OF PROCESSING LOGS USING A THERMAL CAMERA

This application is a U.S. National Phase under 35 U.S.C. § 371 of International Application No. PCT/IB2020/051938, filed Mar. 6, 2020, which claims priority under 35 U.S.C. §§ 119 and 365 to Swedish Application No. 1950291-3, filed Mar. 7, 2019.

TECHNICAL FIELD

The present disclosure relates to a device and method for processing logs, and in particular for deicing and debarking logs. The device and method are particularly suitable for use in connection with a debarking process, i.e. a process wherein logs are debarked for further processing into e.g. pulp and/or planks.

BACKGROUND

It is well known that processing of lumber logs often includes a debarking step, whereby the bark preset at the surface of the log is removed. Such debarking is preferably performed on logs that are in a non-frozen state.

However, logs are frequently stored outside in anticipation of processing. Hence, during the cold season, logs may be completely frozen, which may negatively affect the debarking process.

It may thus be necessary to deice the logs prior to debarking.

Deicing is conventionally achieved by applying hot water or steam to the logs while the logs are being transported on a covered conveyor.

In some applications, the logs are fed many at a time, rather than as individual logs. Hence, a plurality of logs may be fed in parallel on the same conveyor, through the deicing and debarking apparatuses.

Debarking may be achieved by passing the logs through a drum which rotates about a slightly downwardly tilted rotational axis, with the drum walls having protrusions that engage the logs to sever the bark and optionally holes or slits through which bark that has been released from the logs may escape. Hence, the debarking may be achieved through a combination of interaction between the protrusions and the logs and through the interaction of logs with each other.

One challenge is to deice the logs sufficiently for it to be possible to easily remove the bark, while minimizing heat energy supply.

Another challenge is that nozzles that supply deicing medium to the logs may be damaged, e.g. by being struck by logs, or clogged, e.g. by particles or debris that make its way into the deicing medium.

Malfunction of the deicing medium supply may lead to uneven deicing, e.g. resulting in some logs being deiced and others not.

EP1273404A1 discloses various methods of defrosting logs prior to debarking. The defrosting is achieved by means of applying water or steam onto the frozen logs, and the temperature of the water falling off the logs is measured. According to EP1273404A1, the most efficient ways of defrosting logs are by applying water or steam to the logs. Nevertheless, defrosting of logs is associated with a substantial consumption of energy.

However, there remains a need for a more energy efficient deicing and debarking device and method. There is also a need for a deicing and debarking method that is more robust.

SUMMARY

A general object of the present disclosure is to provide a device and method which improve the deicing and debarking process. Particular objects include to provide a device and method which improve the efficiency of the deicing method and which overcome problems with malfunctions in the deicing system.

The invention is defined by the appended independent claims. Embodiments are set forth in the dependent claims, in the following description and in the attached drawings.

According to a first aspect, there is provided a device for processing logs, comprising a deicing apparatus, a debarking apparatus, arranged downstream of the deicing apparatus, a thermal camera, arranged to acquire a thermal image of at least one log downstream of the debarking apparatus, and a processing device, configured to receive the thermal image from the thermal camera, to process the thermal image to determine a log surface temperature, and to provide a deicing control signal to the deicing apparatus based on the log surface temperature.

Apparatuses for deicing logs are known to the skilled person, as are apparatuses for debarking one or more logs at a time.

Thermal cameras are also known and can be readily acquired.

A "thermal image" is an image that contains information relating to the surface temperature of objects appearing on the image, as opposed to a "visual image", which merely contains information that corresponds to colors visible to the human eye.

The term "based on" means implies that the log surface temperature is used directly and as an only input to provide the control signal, or that the log surface temperature is used as one out of a plurality of factors that are used for determining a control signal. Such additional factors may include a plurality of log surface temperatures, indications of time between log surface temperatures, sensor readouts from other apparatuses, such as from the deicing apparatus and/or the debarking apparatus, etc.

The concept of controlling deicing based on thermal images indicating log surface temperature provides an advantages in that the log temperature can be used as an input for optimizing deicing operation. Furthermore, it can be determined whether a particular log is likely to have been properly debarked or not. It is moreover possible to determine temperature at different positions and on different logs, which, in turn can be used to determine whether logs have been evenly deiced. Based on such a determination, it can be deduced whether the deicing apparatus is functioning properly such that logs are evenly deiced. Hence, the present concept provides for improved operation of a deicing and debarking part of a log processing device.

The deicing apparatus may comprise a housing and a deicing medium applicator, comprising a plurality of deicing medium nozzles, which are distributed in said housing.

A temperature sensor may be arranged for measuring temperature of used deicing medium by the deicing apparatus and to provide a used medium temperature signal, indicating said temperature of used deicing medium to the processing device, and the processing device may be further configured to provide said deicing control signal also based on said used medium temperature signal.

The used medium is the medium which is collected after having been applied towards the logs, i.e. the medium that falls off the logs or that misses the logs and goes directly to collection. The deicing medium nozzles may be connected to a deicing medium source, such as a source or generator of hot water, steam or hot gas.

The deicing apparatus may comprise a conveyor arranged for conveying said at least one log past the deicing medium applicator.

The conveyor may be connected directly to an inlet to of the debarking apparatus.

The debarking apparatus may comprise a drum, which is rotatable about an axis that is downwardly inclined from a drum inlet towards a drum outlet.

Alternatively, or as a supplement, the debarking apparatus may comprise a cutting device and a second conveyor adapted to move said at least one log while said at least one log is engaged by the cutting device.

The device may further comprise a third conveyor, which is connected to an outlet of the debarking apparatus.

At least one bark temperature sensor may be arranged for measuring temperature of bark removed from the log in the debarking apparatus and to provide a bark temperature signal, indicating said temperature of the bark to the processing device, and the processing device may be further configured to provide said deicing control signal also based on said bark temperature signal.

The thermal camera may be positioned such that the thermal image can be acquired within 30 seconds from the log(s) exiting the debarking apparatus, preferably within 20 seconds, within 10 seconds or within 5 seconds.

The device may further comprise a cutting apparatus, arranged downstream of the debarking apparatus, for cutting the logs into wood chips.

Hence, the device may be used to process logs before entering into a pulp making process.

According to a second aspect, there is provided a method of processing logs, comprising providing at least one log, deicing the at least one log in a deicing apparatus, debarking the at least one log in a debarking apparatus, downstream of the deicing apparatus, acquiring a thermal image depicting the at least one log using a thermal camera, downstream of the debarking apparatus, processing the thermal image to determine a log surface temperature, and providing a deicing control signal to the deicing apparatus based on the log surface temperature.

The deicing control signal may cause an adjustment of deicing intensity.

The method may further comprise acquiring a used medium temperature signal, indicating a temperature of used deicing medium in the deicing apparatus, and to provide said deicing control signal to the deicing apparatus also based on said used medium temperature signal.

As non-limiting examples, the control signal may cause an increase or decrease in the rate of application of deicing medium, an increase or decrease in the temperature of deicing medium, or an increase or decrease in the relative movement speed between the deicing apparatus and the log(s).

Additionally, the debarking control signal may further provide a debarking control signal to the debarking apparatus based on the log surface temperature.

The debarking control signal may cause an adjustment of debarking intensity.

As non-limiting examples, the debarking control signal may cause an increase or decrease in the rotational speed of a debarking drum. Where cutters are used, an increase or decrease can be provided in cutter speed, cutting feed rate or cutting pressure.

The method may further comprise acquiring a bark temperature signal, indicating a temperature of bark expelled from the debarking apparatus, and to provide said debarking control signal to the debarking apparatus also based on said bark temperature signal.

Processing the thermal image may comprise distinguishing a log surface from a background. The background may be the conveyor on which the log(s) is/are being transported.

The log surface may be distinguished from the background based on at least one of a temperature and a shape identified in the thermal image.

The method may further comprise acquiring a visual spectrum image corresponding to the thermal image, wherein said log surface is distinguished from the background based on at least one of a visual spectrum color associated with the background, a visual spectrum color associated with the at least one log or a shape derived from the visual spectrum image.

The visual spectrum image should correspond to the thermal image in that it depicts the same view of the same object(s). This may be achieved by the camera acquiring, in rapid succession, one thermal and one visual spectrum image. Alternatively, the camera may be a hyperspectral camera, acquiring an image corresponding both thermal and visual spectra, from which a thermal image and a visual spectrum image can be derived.

The method may further comprise acquiring position data of the at least one log, wherein said log surface is distinguished from the background based on position data of the at least one log.

For example, a laser triangulation sensor may be used to determine the shape of the log(s) as it/they pass before the camera. By subtracting the shape of the background, such as the empty conveyor, the position of the log(s) can be determined and associated with the thermal and/or visual image data, whereby it can be determined what part of the image date is background and what part of the image data is log surface.

The method may further comprise determining an average log temperature surface based on a plurality of log surface positions, and using said average log surface temperature for providing the control signal and/or for providing an alarm signal.

The method may further comprise determining a variation in log surface temperature based on a plurality of log surface positions, and using said variation in log surface temperature for providing the control signal and/or for providing an alarm signal.

In the method, a plurality of logs may be fed in parallel through at least one of the deicing step and the debarking step.

Alternatively, only one log at the time may be fed through at least the debarking step.

DETAILED DESCRIPTION

Figure 1:
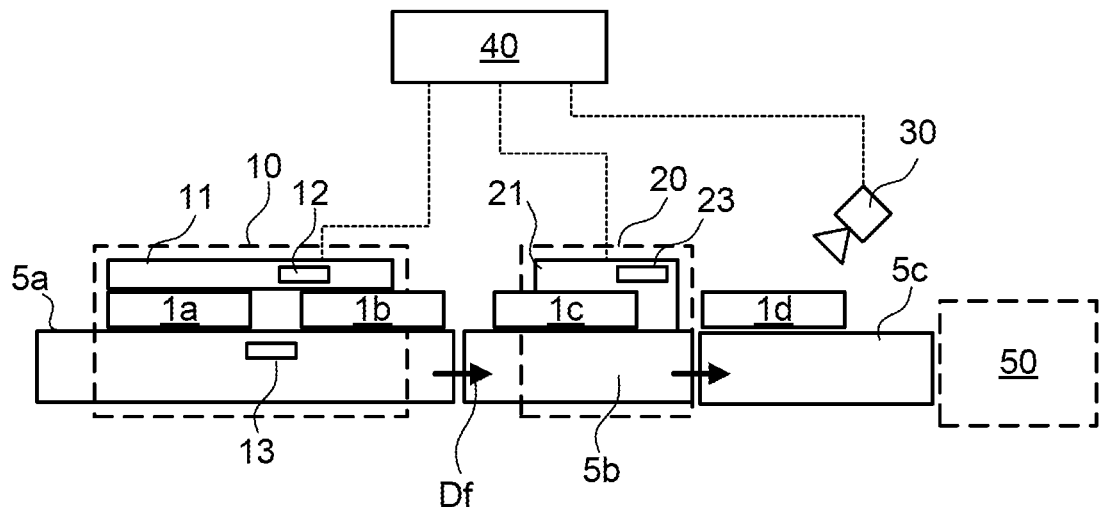
FIG. 1 is a schematic side view of a portion of a log processing system according to a first embodiment.
Figure 2:
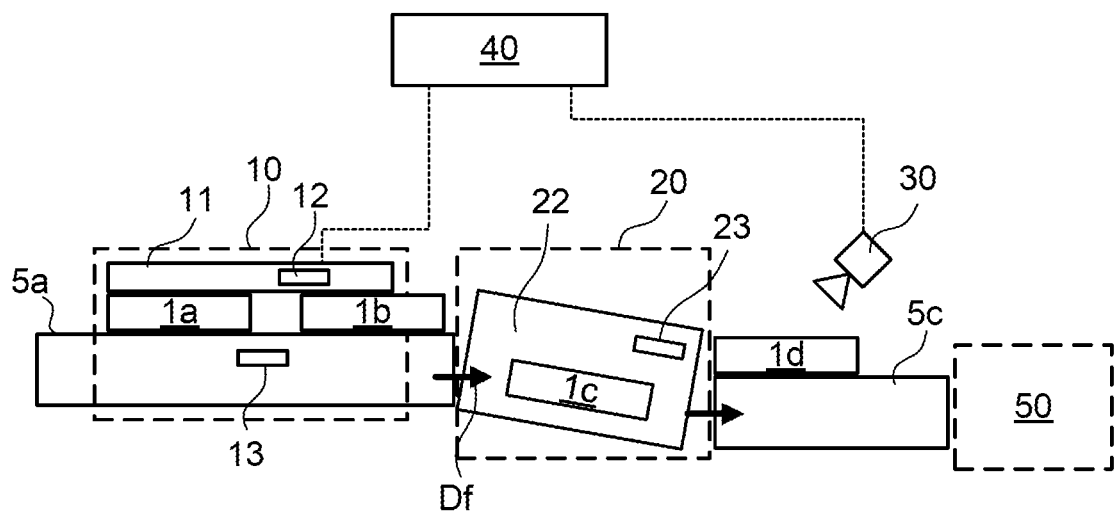
FIG. 2 is a schematic side view of a portion of a log processing system according to a second embodiment.

Referring to FIGS. 1 and 2, there is illustrated a portion of a log processing arrangement, including a conveyor 5, a deicing zone 10 and a debarking zone 20.

The conveyor 5a, 5b, 5c may be one or more belt or chain type conveyor(s), as is conventionally used in the processing of logs 1a, 1b, 1c, 1d. The conveyor 5a, 5b, 5c may be a single conveyor which runs throughout the deicing and debarking zones 10, 20. Alternatively, a plurality of conveyors 5a, 5b, 5c may be used to achieve the conveying of the logs 1a, 1b, 1c, 1d to, through and/or from the deicing and debarking zones 10, 20. It is understood that a limited buffer station may be positioned between the deicing and debarking zones 10, 20. However, preferably, the debarking zone 20 follows immediately on the deicing zone 10.

The deicing zone 10 comprises a deicing apparatus 11, which may include a plurality of nozzles 12 adapted to apply a heated fluid deicing medium towards logs 1a, 1b, 1c, 1d that are being transported through the deicing zone 10. The nozzles 12 may apply water, e.g. in hot, steam or superheated form. Alternatively, the nozzles 12 may apply hot air or other hot gas towards the logs 1a, 1b, 1c, 1d.

The deicing zone 10 may further comprise a temperature sensor 13, which is arranged to measure a temperature of used deicing medium. The sensor 13 may be arranged in a deicing medium collection receptacle and/or in a deicing medium collection channel.

In some embodiments, the nozzles 12 may be fixed and the logs 1a, 1b, 1c, 1d may be movable relative to the nozzles. In other embodiments, the nozzles 12 may be movable, while the logs 1a, 1b, 1c, 1d are kept stationary or moving during the application of the fluid medium.

The application of the fluid medium may be controllable such that an amount of heat energy, and thus a deicing intensity, delivered to the logs 1a, 1b, 1c, 1d can be controlled.

For example, at least one of a medium temperature, a medium delivery rate, a medium delivery pressure and a medium delivery distance may be controllable. The nozzles 12 may be divided into sub-zones inside the deicing apparatus 10, such that different deicing intensity may be provided in different zones along a conveyor 5a passing through the deicing zone 10.

In the embodiment illustrated in FIG. 1, the debarking zone 20 comprises a debarking apparatus 21 which uses cutters, teeth, scrapers or the like (not shown) to cut, grind or mill away the bark from the log, while the logs are being moved through the debarking zone 20 by means of a conveyor 5b.

Further, in embodiments (FIG. 1) using cutters or the like, at least one of bark removal device pressure, cutting speed and log feed speed may be controllable.

In the embodiment illustrated in FIG. 2, the debarking apparatus 22 comprises a drum, that is rotatable about a slightly sloping geometric axis. Drum walls may have inwardly extending protrusions, against which logs present in the drum will strike when the drum is rotated. The drum walls may also have openings, through which bark removed from the logs may escape.

The debarking apparatus 22 may be controllable, such that a debarking intensity may be controlled.

In embodiments (FIG. 2) using a drum debarking apparatus 22, drum rotation speed, drum rotation axis slope and/or drum feed rate may be controllable.

In embodiments using a drum, the drum will act both as debarking apparatus and as conveyor.

The barking zone 20 may further comprise a temperature sensor 23, which is arranged to measure a temperature of bark that is expelled from the debarking apparatus 21, 22. The sensor 23 may be arranged in a bark collection receptacle.

Logs exiting the debarking apparatus 21, 22 may be received by a third conveyor 5c.

Downstream of the debarking zone 20, there is thus provided the third conveyor 5c and a thermal camera 30, which is connected to a processing device 40.

The thermal camera 30 is configured to acquire thermal images of logs 1a, 1b, 1c, 1d downstream of the debarking apparatus. The acquisition of images preferably takes place within 30 seconds, preferably within 15 seconds or within 5 seconds, of the logs leaving the debarking apparatus 20.

The third conveyor 5c may convey debarked logs into an apparatus for further processing, such as a cutting apparatus 50, which may be arranged for sawing debarked logs into planks, or for cutting debarked logs into chips that can be further processed into pulp.

The processing device 40 is configured to receive thermal images or video clips from the thermal camera 30, and to provide control signals to the deicing apparatus 11 and optionally also to the debarking apparatus 21.

The processing device 40 may further be configured to determine a log average temperature, and to use this temperature as a basis for determining whether to provide a control signal that will cause an adjustment of the operation of the deicing apparatus 11.

In one embodiment, the processing device 40 may be configured to distinguish, in a thermal image, one or more logs 1a, 1b, 1c, 1d from a background, which may include e.g. the conveyor and conveyor frame.

Such distinction may be based on temperature, e.g. in that log temperature is consistently different from background temperature.

For example, a certain temperature interval, as depicted in the thermal image, may be assigned as background and another temperature interval may be assigned as foreground, i.e. log(s).

Hence, an average log temperature may be calculated for each image.

An accumulated average log temperature may be calculated over a plurality of images.

The deicing system may then be controlled based on such average temperature, with a view to achieve sufficient debarking with a minimum of energy supply in the deicing zone 10.

Alternatively, or as a supplement, a log temperature distribution may be determined based on the image.

A variance of the temperature distribution in excess of a certain value, or a drift or change in such variance, may indicate a malfunction in the deicing system, leading to uneven deicing.

It is further possible to apply a shape recognition algorithm to distinguish foreground and background. Hence, logs may be distinguished as generally elongate, rectangular areas in a thermal image.

It is further possible to acquire a visual spectrum image corresponding to a thermal image, and to use the visual spectrum image in distinguishing background and foreground. For example, in a visual spectrum image, certain colors may be assigned as background, with other colors being assigned as foreground. A distinction map thus provided based on the visual image may then be applied to the thermal image in order to distinguish background from foreground. The average log surface temperature and/or log temperature distribution may then be calculated for those areas of the thermal image that, based on the visual image were determined to belong to actual logs.

It is also possible to use such visual and/or thermal images for identifying remaining bark on the debarked logs. A control signal to the deicing may thus be based also on such information.

For example, where the temperature of the logs is determined as correct (i.e. in a certain range and with certain variance) and there is bark on the logs, it can be deduced that it is the debarking zone 20 that is not functioning properly. Hence, a control signal may be provided to the debarking apparatus 21, 22 causing it to increase debarking intensity. Alternatively, an alarm may be provided to prompt operator attention to a potential error in the debarking apparatus 21, 22.

As another example, where the temperature is too low and there is bark on the logs, it may be deduced that it is the deicing zone 10 that is not functioning properly. Hence, a control signal may be provided to the deicing apparatus 11, causing it to increase deicing intensity. Alternatively, an alarm may be provided to prompt operator attention to a potential error in the deicing zone 10.

Furthermore, where a log surface temperature distribution is determined to exceed a certain threshold, this may indicate an error in the deicing zone 10. Such errors may be related to clogging of deicing nozzles or damage to deicing nozzles, which may render the deicing ineffective in certain parts of the deicing zone 10.

In applications where the used deicing medium temperature is measured, it is possible to use such measurement for providing the deicing control signal. For example, the deicing apparatus 11 may be controlled with a view to keeping the used deicing medium temperature within a predetermined temperature interval. The values of such interval may be determined empirically and may depend on environmental factors, such as the ambient temperature, and on the starting temperature of the logs.

In applications where the bark temperature is measured, it is possible to use such measurement for providing the deicing control signal and/or for providing the debarking control signal. Again, just like with the used deicing medium temperature, it may be desirable to keep bark temperature within a predetermined temperature interval.

Such used deicing medium temperature and/or bark temperature may provide faster feedback than the thermal images, and may thus be used to provide fast feedback to the deicing and debarking zones 10, 20, while the data derived from the thermal image may be used to verify or supplement the information obtained by the temperature sensors 13, 23 and to determine e.g. temperature distribution of the log surface temperatures.

It is also possible to provide a 3D vision system for recognizing logs and to discriminate between what is a log and what is the background. For example, a laser triangulation system may be used to determine whether there is any object on the conveyor and where the limits of such object are.

The invention claimed is:

1. A device for processing logs, comprising:
   a deicing apparatus,
   a debarking apparatus arranged downstream of the deicing apparatus,
   a thermal camera arranged to acquire a thermal image of at least one log downstream of the debarking apparatus, and
   a processing device, configured to:
   receive the thermal image from the thermal camera,
   process the thermal image to determine a log surface temperature, and
   provide a deicing control signal to the deicing apparatus based on the log surface temperature.

2. The device as claimed in claim 1, wherein the deicing apparatus comprises a housing and a deicing medium applicator comprising a plurality of deicing medium nozzles distributed in said housing.

3. The device as claimed in claim 2, further comprising:
   at least one temperature sensor arranged for measuring a temperature of used deicing medium from the deicing apparatus and providing a used medium temperature signal, indicating said temperature of used deicing medium to the processing device (40),
   wherein the processing device is further configured to provide said deicing control signal also based on said used medium temperature signal.

4. The device as claimed in claim 1, wherein the deicing apparatus comprises a first conveyor arranged for conveying said at least one log past the deicing medium applicator.

5. The device as claimed in claim 4, wherein the first conveyor is connected directly to an inlet of the debarking apparatus.

6. The device as claimed in claim 1, wherein the debarking apparatus comprises a drum which is rotatable about an axis that is downwardly inclined from a drum inlet towards a drum outlet.

7. The device as claimed in claim 1, wherein the debarking apparatus comprises a cutting device and a conveyor adapted to move said at least one log while said at least one log is engaged by the cutting device.

8. The device as claimed in claim 1, further comprising:
   a conveyor connected to an outlet of the debarking apparatus.

9. The device as claimed in claim 1, further comprising:
   at least one bark temperature sensor arranged for measuring temperature of bark removed from the at least one log in the debarking apparatus and providing a bark temperature signal indicating said temperature of the bark to the processing device,
   wherein the processing device is further configured to provide said deicing control signal also based on said bark temperature signal.

10. The device as claimed in claim 1, wherein the thermal camera is positioned such that the thermal image is configured to be acquired within 30 seconds from the at least one log exiting the debarking apparatus.

11. The device as claimed in claim 1, further comprising:
    a cutting apparatus, arranged downstream of the debarking apparatus for cutting the at least one long into wood chips.

12. A method of processing logs, comprising:
    providing at least one log,
    deicing the at least one log in a deicing apparatus,
    debarking the at least one log in a debarking apparatus, downstream of the deicing apparatus,
    acquiring a thermal image depicting the at least one log using a thermal camera, downstream of the debarking apparatus,
    processing the thermal image to determine a log surface temperature, and
    providing a deicing control signal to the deicing apparatus based on the log surface temperature.

13. The method as claimed in claim 12, wherein the deicing control signal causes an adjustment of deicing intensity.

14. The method as claimed in claim 12, further comprising:
  acquiring a used medium temperature signal, indicating a temperature of used deicing medium in the deicing apparatus, and
  providing said deicing control signal to the deicing apparatus also based on said used medium temperature signal.

15. The method as claimed in claim 12, further comprising providing a debarking control signal to the debarking apparatus based on the log surface temperature.

16. The method as claimed in claim 15, wherein the debarking control signal causes an adjustment of debarking intensity.

17. The method as claimed in claim 12, further comprising:
  acquiring a bark temperature signal, indicating a temperature of bark expelled from the debarking apparatus, and
  providing said debarking control signal to the debarking apparatus also based on said bark temperature signal.

18. The method as claimed in claim 12, wherein processing the thermal image comprises distinguishing a log surface from a background.

19. The method as claimed in claim 18, wherein said log surface is distinguished from the background based on a temperature derived from the thermal image, a shape derived from the thermal image, or both.

20. The method as claimed in claim 18, further comprising:
  acquiring a visual spectrum image corresponding to the thermal image,
  wherein said log surface is distinguished from the background based on: a visual spectrum color associated with the background, a visual spectrum color associated with the at least one log, a shape identified in the visual spectrum image, or a combination thereof.

21. The method as claimed in claim 18, further comprising:
  acquiring position data of the at least one log,
  wherein said log surface is distinguished from the background based on the position data of the at least one log.

22. The method as claimed claim 12, further comprising:
  determining an average log temperature surface based on a plurality of log surface positions, and
  using said average log surface temperature for providing the control signal, for providing an alarm signal, or for providing both.

23. The method as claimed in claim 12, further comprising:
  determining a variation in log surface temperature based on a plurality of log surface positions, and
  using said variation in log surface temperature for providing the control signal, for providing an alarm signal, or for providing both.

24. The method as claimed in claim 12, wherein a plurality of logs are fed in parallel through the deicing step, the debarking step, or both.

25. The method as claimed in claim 12, wherein one log at the time is fed through at least the debarking step.

26. The method as claimed in any claim 12, further comprising,
  cutting the at least one log into chips downstream of the debarking apparatus.

\* \* \* \* \*